June 9, 1936.  J. E. JUSTUS  2,043,379
FILTER
Filed June 5, 1933
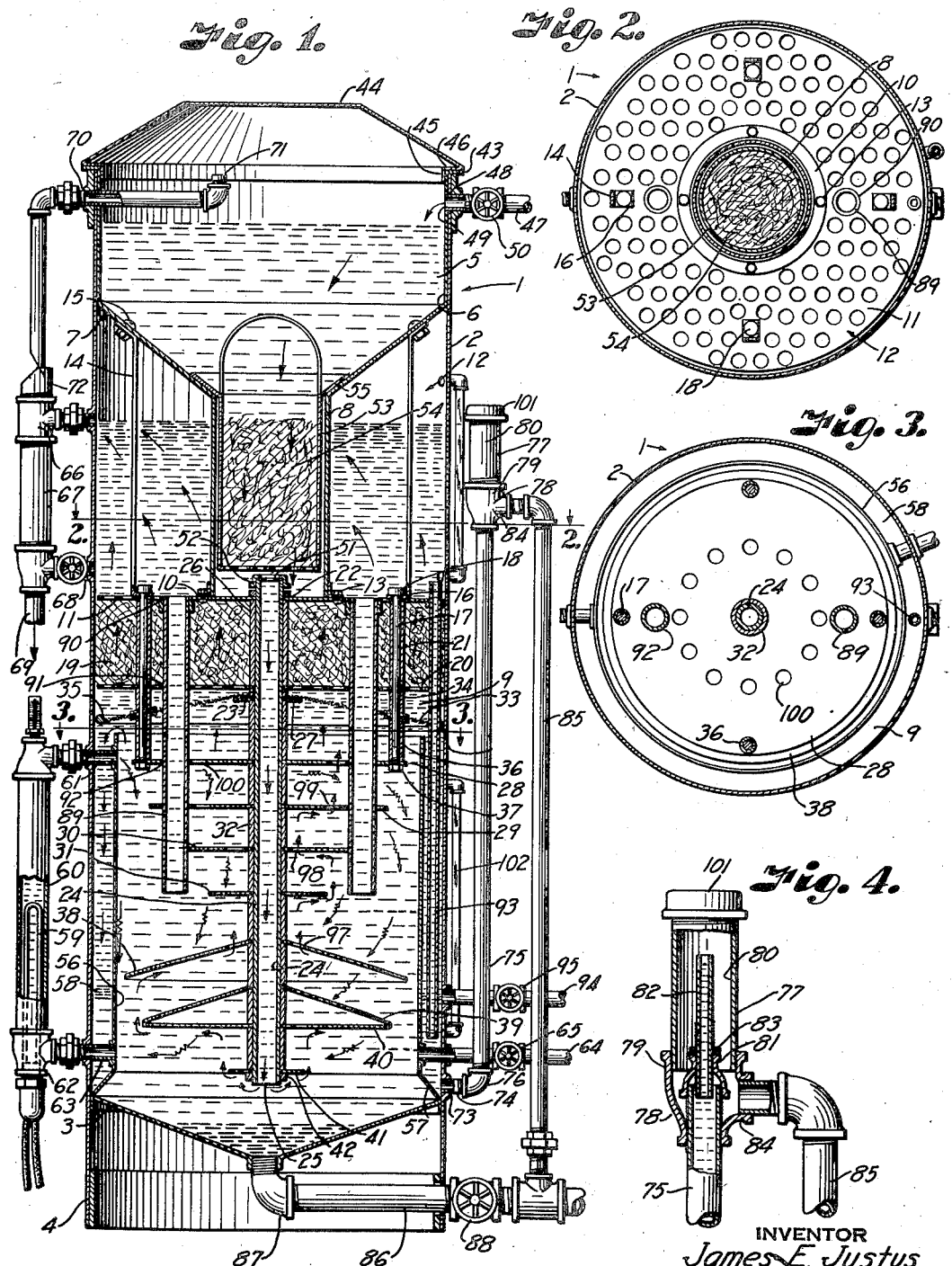
INVENTOR
James E. Justus.
BY
ATTORNEY Patented June 9, 1936

2,043,379

UNITED STATES PATENT OFFICE 2,043,379

FILTER

James E. Justus, Butler, Mo.

Application June 5, 1933, Serial No. 674,296

6 Claims. (Cl. 210—48)

My invention relates to filters and more particularly to those of that character employed in the filtration of lubricating oils after the oils have been charged with carbonaceous and like residue or water, and has for its principal objects to provide an efficient and simply constructed filter arranged to prevent loss of oil in the filtering process and to effectively remove sludges having specific gravities above and below that of the clarifying liquid employed in the filter, and to automatically separate and remove water from the oil.

In accomplishing these and other objects of the invention, I have provided improved details of structure, the preferred form of which is illustrated in the accompanying drawing, wherein:

Fig. 1 is a vertical section through a filter constructed in accordance with my invention.

Fig. 2 is a horizontal sectional view on the line 2—2, Fig. 1.

Fig. 3 is a horizontal section on the line 3—3, Fig. 1.

Fig. 4 is an enlarged view partly in section of the wash liquid overflow head for controlling level of the wash liquid in the filter.

Referring more in detail to the drawing:

1 designates a tank including a cylindrical wall 2 and a cone shaped bottom 3 inset from the lower end of the wall to form a skirt or base portion 4 for supporting the tank.

Suspended within the top of the tank is a filtration unit including an oil inlet chamber 5 having a cylindrical wall portion 6 sleeved within the upper portion of the tank and terminating in a downwardly and inwardly sloping bottom 7 arranged to guide dirty oil and sediment into a neck or well 8 from which the oil flows to the clarifying or wash chamber 9 in the bottom portion of the tank.

Fixed to the lower end of the neck 8 is an annular flange 10 for attaching a circular disk 11 of suitable diameter to slidably engage the wall of the tank and form the bottom of an annular filtrate receiving and settling chamber 12. The disk 11 is secured to the flange 10 by suitable fastening devices 13 extending through openings in the flange and aligning openings in the disk as clearly illustrated in Fig. 1.

The outer portion of the disk 11, or that portion extending outwardly from the neck 8, is perforated and is supported from the bottom of the inlet chamber 5 by straps 14 having their upper ends secured to the sloping bottom 7 by fastening devices 15 and their lower ends are provided with apertured foot portions 16 engaging against the disk 11. Extending through the apertures in the foot portions 16 and through the aligning openings in the disk are rods or bolts 17 having heads 18 engaging against foot portions of the straps to suspend the bolts in position for supporting a filter bed 19 and a plurality of baffle members around which the oil is circulated during the purification or clarifying process as later described.

The filter bed 19 forms a division between the filtrate and clarification chambers and is preferably formed of sisal waste or other suitable moisture repellent material that is retained against the disk 11 by a perforated disk 20 suspended in spaced relation therewith on the rods 17, suitable spacing members 21 being sleeved on the rods and having their opposite ends engaging against the adjacent faces of the respective disks.

Extending through openings 22 and 23 in the center of the respective disks is a pipe 24 having its upper end supported by the upper disk and its lower end spaced from the bottom 3 to provide an outlet 25 for the oil. The pipe 24 is also provided with a spacing sleeve 26 which cooperates with the spacing members 21 to retain the lower disk in horizontal alignment when the unit is assembled.

Sleeved on the pipe 24 below the disk 20 are baffle members 27, 28, 29, 30 and 31, each including a flat horizontally arranged circular plate spaced from the adjacent disks by sleeves 32. The baffle 27 forms a central support for a cone shaped foraminous diaphragm 33 having substantially the same diameter as the inner diameter of the tank for distributing the oil uniformly over the under surface of the filter bed as later described.

The outer portion of the screen is supported in spaced relation with the disk 20 by spacing sleeves 34 sleeved on the bolts 17 and its periphery may be reenforced by a band or frame 35, as shown in Fig. 1.

The lower ends of the bolts 17 also extend through openings in the periphery of the baffle plate 28 and are provided with spacing sleeves 36 to retain the outer edge of the baffle in spaced relation with the screen 33 when the nuts 37 are threaded on the lower end of the bolts to clamp baffle 28, screen 33 and the disks 11 and 20 together.

The disks 28, 29, 30 and 31 decrease in diameter toward the bottom of the filter so that the oil rising from the periphery of the lower disk will be diverted by an upper disk and directed in a tortuous path through the wash liquid in the clarifying chamber as later described.

Also supported on the pipe section 24 at the lower end thereof are spaced cone shaped baffles 38 and 39, the lower baffle 39 being of smaller diameter than the upper baffle and having its base closed by a horizontal diaphragm 40.

Mounted on the lower end of the pipe section and spaced from the diaphragm 40 is a horizontally arranged spreader disk 41 to cause the oil stream issuing from the pipe to divide into a plurality of globules when it changes its direction of travel for passage through the wash liquid as later described.

The disk 41 and the baffles 39, 38, 31, 30, 29 and 28 may all be retained on the pipe 24 by a nut 42 threaded on the lower end thereof as illustrated in Fig. 1.

It is thus apparent that the filter bed including the screen 33 and all of the baffle members are suspended as a unit from the bottom of the inlet chamber 5 so that all of the parts may be inserted or removed as a unit through the top of the tank 1.

The upper edge of the wall portion 6 of the inlet chamber is provided with an outwardly extending flange 43 for engaging the upper edge of the tank 1 to support the unit in position.

The top of the tank including the inlet chamber is closed by a cover 44 having an inset depending flange 45 engaging the inner wall of the inlet chamber and having an annular shoulder portion 46 for seating on the upper base of the flange 43 to provide a substantially tight joint.

Oil to be filtered is admitted to the inlet chamber through a pipe 47 extending through an opening 48 in the wall of the tank and through an opening 49 in the wall portion of the inlet chamber respectively.

The flow into the inlet chamber may be controlled by a suitable hand valve 50 positioned in the pipe 47.

In order to control the rate of flow of oil from the inlet chamber through the well 8 and pipe 24 I provide the inlet of the pipe with an orifice plate 51 having an orifice of suitable diameter to pass the oil at a fixed predetermined rate, the orifice plate being retained by a flange cap 52 screwed over the end of the pipe.

In order to provide an initial strainer for the oil and prevent clogging of the orifice, I provide the well 8 with a perforated bucket 53 carrying a quantity of loosely packed material 54 through which the oil must flow on its way to the pipe 24.

The bottom of the bucket is supported in spaced relation with the pipe section 24 by an annular flange 55 seating against the inclined bottom 7 of the inlet chamber. The bucket 53 may be equipped with a suitable bail by which it may be readily removed from the filter.

The body of wash liquid is preferably contained in a cylindrical open topped compartment in the lower portion of the tank 1 that is formed by a circular wall 56 having an outwardly and downwardly extending flange 57 engaging the wall of the tank at the juncture of the bottom 3. The wall terminates in spaced relation with the screen 33 to provide a circumferential weir over which light sludge flows into the annular chamber 58 that is formed between the wall 56 and the wall of the tank.

The wash liquid is heated by a suitable heater 59 to reduce the viscosity of oil passing through the filter. The heater 59 is preferably mounted exteriorly of the tank and includes an electrical resistance element mounted in a pipe section 60 having its upper end connected with an upper portion of the wash liquid compartment at a point below the top of the clarifying chamber by means of a nipple 61 extending through the wall of the tank and sealingly engaged in the wall 56. The lower end of the pipe section is connected adjacent the bottom of the tank by a T-fitting 62 having a similar nipple 63. The heater element 59 is mounted in the lower branch of the T-fitting, as clearly illustrated in Fig. 1.

It is thus apparent that the wash liquid in the wash chamber formed by the wall 56 is constantly circulated in counter flow to the oil by thermosiphonic action.

The wash liquid may be admitted to the clarifying chamber through a pipe 64 having a valve 65 to close flow through the pipe when the compartment is filled, as later described.

Oil flows from the annular chamber 12 through a T-connection 66 on the upper end of a vertical pipe 67 having its lower end connected with an outlet 68 at the lower portion of the chamber 12 and to a pipe 69 through which the purified oil is returned to the point of use.

In order to admit air to the inlet compartment 5 and provide for over-flow in case the dirty oil is admitted faster than it flows through the flow orifice, the upper part of the tank is provided with an outlet pipe 70 having its inlet 71 located above the opening 49 and having its lower end depending into a nipple 72 that is threaded in the upper part of the T 66 as illustrated in Fig. 1 so that the surplus oil flowing into the chamber 5 will pass directly to the pipe 69.

In order to control the wash liquid level in the filter, I provide for balancing a column of wash liquid against the hydrostatic head of oil carried above the wall 56 plus the liquid carried in the annular chamber 58 as now to be described.

Threaded into an opening 73 in the lower part of the tank 1 and communicating with the annular chamber 58 is a nipple 74 connected with a vertical pipe section 75 by an L 76.

The pipe section 75 extends vertically of the tank to a point adjacent the chamber 12 and carries a regulating head 77 by which wash liquid level in the filter may be maintained at a predetermined level in the annular chamber 58. The head 77 includes a T-fitting 78 threaded on the upper end of the pipe 75 and having an enlarged branch 79 for supporting a pipe section 80 of larger diameter than the pipe 75.

Also threaded onto the upper end of the pipe 75 is a reducer coupling 81 for adjustably mounting a pipe nipple 82, the pipe nipple being threadedly mounted in the upper end of the coupling, as illustrated at 83 so that its outlet end may be adjusted to balance a given quantity of oil and wash liquid in the filtrate and annular chambers.

Connected to the side branch 84 of the T-fitting 78 is an outlet pipe 85 that is connected with a waste pipe 86 at the bottom of the filter. Also connected into the waste pipe 86 in an L-fitting 87 through which the sludge and foreign material heavier than the wash liquid may be drained upon opening of a valve 88 which is connected into the pipe 86.

In order to stabilize the pressures in the filtrate or settling chamber 12 and in the clarifying chamber, and to allow the return to the clarifying chamber of any sediment or moisture that might possibly be carried through the filter bed 19 into settling chamber 12, I provide pipes 89 having their upper ends mounted in openings 90 formed in the upper disk 11.

The pipes 89 have their lower ends extending through openings 91 in the lower disk 20, through the screen and through openings 92 in the baffle plates 28 and 29 so that the lower end of the pipe 89 extends into the body of wash liquid, thereby providing direct communication between the respective chambers, whereby the pressures are stabilized.

In case of clogging of the filter bed, I provide for preventing the oil from being pushed out through the pipe 75. This is accomplished by means of a pipe 93 communicating with the clean oil chamber 12 and depending to a point spaced above the water outlet 73.

The annular chamber 58 is provided with a drain pipe 94 located at a point above the water inlet pipe 64 and is provided with a shut-off valve 95 so that the lighter sludge may be removed from time to time as hereinafter described.

In operating a filter constructed and assembled as described, a sufficient amount of wash liquid such as water is admitted through the pipe 64 to bring the water level to the top of the wall 56 from which the surplus water overflows into the bottom of the annular chamber 58 and begins to run out through the pipe 94.

At this point the valves 64 and 95 are closed. The water is then heated by connecting the heater element with a suitable source of current supply. Oil is then admitted to the inlet chamber through the pipe 47 by opening the valve 50 so that the oil is fed through the waste 54 and orifice plate into the pipe 24.

The waste 54 will, of course, remove much of the larger particles carried in the oil stream to prevent them from clogging the orifice in the rate of flow plate. Oil, upon passing from the lower end of the pipe 24 tends to rise upwardly through the body of water contained in the clarifying chamber and is distributed around the periphery of the disk 41 to break into a plurality of globules which, due to their lighter specific gravity, bubble upwardly through the water and engage the diaphragm 40 of the cone shaped baffle 39.

Upon engaging the diaphragm 40, the globules will move outwardly toward the periphery of the cone shaped baffle 39 where they will rise upwardly through the water until stopped by the cone shaped baffle 38.

Upon engaging the baffle 38, they will move upwardly and inwardly along the inclined inner surface thereof and pass through openings 97 to engage the baffle 31.

The globules of oil will then move outwardly from the baffle 31 and will rise until engaged by the baffle 30 which will cause the globules to move upwardly and inwardly and pass through openings 98 and around the periphery of the disk 30.

The bubbles will then rise and engage the baffle 29 where they will move outwardly toward its periphery or inwardly to pass through openings 99 to engage the baffle 28 which is provided with a plurality of apertures 100 for spreading the globules over the lower part of the screen 33.

When the oil reaches the top of wall 56, the oil will overflow filling the annular space 58 and forcing the wash liquid, which has collected in the lower part of the space 58, up pipe 75 until the hydrostatic head of liquids in the tank and pipe 75 balance.

Upward movement of the globules of oil, upon engaging the screen will be retarded thereby so that they will be distributed uniformly for passage through the filter bed 19 and through the apertures in the disk 11 into the clean oil settling chamber 12. When the level of the oil in the chamber 12 reaches the outlet fitting 66, it will flow through the pipe 69 to the point of use from which it was delivered through the pipe 47.

When the oil begins to flow through the outlet 66, the cap 101 on the control head is removed and the level of water in the annular space is adjusted by regulating the height of the nipple 82 so that when the water level is at the proper height, the head of water in the pipe 75 will counter balance the head of oil in the chamber 12 to maintain the required amount of water to seal the lower part of the annular chamber 58.

Should the water level tend to rise, the increased static head in the annular chamber will cause the surplus water to flow through the pipe 75, over the nipple 82 and out through the pipe 85 until the static heads of the water and oil are again balanced.

In order to maintain sufficient water in the annular space 58, additional water will be admitted through the pipe 64 until water reaches the level of the pipe 94. This may be ascertained by observing a suitable gauge glass 102. The valve 65 is then closed.

The pipe 93 also performs an important function in maintaining the predetermined level of water in the filter since the pressures in the chambers 12 and 58 are stabilized therethrough and should the filter bed 19 tend to clog so that the oil cannot flow readily therethrough, the pressure of the oil in the inlet chamber 5 will, of course, cause the water to be forced from the filter through the pipe 75, but as soon as the water level reaches the lower end of the pipe 93 the oil trapped above the water will flow directly therethrough to the settling chamber and prevent further flow through the water outlet pipe 75.

This is because the water is heavier than the oil and it flows through the outlet 73 rather than rising through the body of oil in the tube 93. The oil upon reaching the bottom of the pipe 93 and being of the same specific gravity as the fluid in the pipe can rise freely therethrough to the exclusion of the water.

It is true that unfiltered oil will pass into the chamber 12, but the oil will not be wasted as it is returned to the point of use instead of being forced with the water out through the pipe 75 as would be the case if the pipe 93 were not provided.

The oil in its tortuous path around the baffles is thoroughly washed by the water and all water soluble elements contained in the oil are removed. Heavy solid particles carried in suspension with the oil are also dropped from suspension due to retarded movement of the oil, and will be collected in the bottom of the tank 1 from which they will be removed from time to time by opening the valve 88.

Solid particles that are lighter than the wash liquid, but heavier than the oil will collect upon the top of the wash liquid and flow over the weir 57 into the annular chamber 58 to collect on the top of the water in the bottom thereof from which they may be removed by opening the valve 95. Since the body of liquid in the annular chamber 58 remains in a substantially quiescent state it forms an insulation for conserving heat of the wash fluid thereby adding to the efficiency of the apparatus.

As the globules of oil flow through the filter bed 19, entrained moisture will be removed by the waste. However, should water pass the filter bed, it will be returned through the bottom of the settling chamber through the pipes 89.

What I claim and desire to secure by Letters Patent is:

1. A filter including a tank having an oil inlet chamber at its upper end, a filter bed, means supporting the filter bed in the tank, a wall in the tank below the filter bed to form a wash liquid compartment and an annular chamber for receiving overflow from the compartment, means supplying a wash liquid to said compartment, a series of baffles, a pipe communicating with the inlet chamber for flow upwardly through the wash liquid, means supporting the baffles to effect tortuous flow of the oil through the wash liquid, means communicating with the tank for maintaining a predetermined level of wash fluid in the annular chamber, and a conduit extending through the filter bed and into said annular chamber for equalizing pressures on opposite sides of the filter bed.

2. A filter including a tank having an oil inlet chamber at its upper end, a filter bed, means supporting the filter bed in the tank, an annular wall in the tank below the filter bed to form a wash liquid compartment and an annular chamber for receiving overflow from the compartment, means for delivering oil from the inlet chamber to the wash liquid compartment for flow through the wash liquid and through the filter bed to the filtrate chamber, means communicating with the tank for maintaining a predetermined level of wash liquid in the annular chamber, and a conduit extending through the filter bed and communicating with the filtrate and annular chambers for equalizing pressures on opposite sides of the filter bed.

3. A filter including a tank, a filter bed supported in the tank to provide a filtrate chamber and a clarifying chamber, a wall in the tank below the filter bed to form a wash liquid compartment and an annular chamber for receiving overflow from the compartment, means for delivering oil to be treated for flow through the wash liquid compartment, means communicating with the tank for maintaining a predetermined level of wash fluid in the annular chamber, and a conduit communicating the filtrate chamber with the annular chamber for equalizing pressures on opposite sides of the filter bed.

4. A filter including a tank, a filter bed supported in the tank to provide a filtrate chamber and a clarifying chamber, a wall in the tank below the filter bed to form a wash liquid compartment and an annular chamber for receiving overflow from the compartment, means for delivering oil to be treated for flow through the wash liquid compartment, means communicating with the tank for maintaining a predetermined level of wash fluid in the annular chamber, a conduit connecting the filtrate chamber with the annular chamber for equalizing pressures on opposite sides of the filter bed, and a conduit connected with the bottom of the filtrate chamber and extending into the wash liquid compartment for returning moisture and sediment from the filtrate chamber to the wash liquid compartment.

5. A filter including a tank, a filter bed, means supporting the filter bed in the tank to provide filtrate and clarifying chambers, a wall in the clarifying chamber to form a wash liquid compartment and an overflow chamber and having its upper end forming a weir for overflow from the wash liquid compartment, means supplying a wash liquid to said compartment, means connected with the tank for delivering oil to be filtered to the clarifying chamber, pressure equalizing means having connection with the filtrate chamber at a point above the filter bed and with said overflow chamber at a point below the filter bed for stabilizing pressures in the filtrate and overflow chambers, and means communicating with the tank for maintaining a predetermined level of wash liquid in said overflow chamber.

6. A filter including a tank, a filter bed, means supporting the filter bed in the tank to provide filtrate and clarifying chambers, a wall in the clarifying chamber to form a wash liquid compartment and an overflow chamber and having its upper end forming a weir for passing overflow from the wash liquid compartment to the overflow chamber, means supplying a wash liquid to said compartment, means connected with the tank for delivering oil to be filtered to the clarifying chamber, means communicating with the tank for maintaining a predetermined level of wash liquid in said overflow chamber, a valved outlet pipe connected with the overflow chamber, and a conduit connected with the filtrate chamber at a point above the filter bed and having connection with the overflow chamber at a point below said valved outlet conduit for stabilizing pressures in the filtrate and overflow chambers.

JAMES E. JUSTUS.